United States Patent
Graham et al.

(10) Patent No.: US 9,765,199 B2
(45) Date of Patent: Sep. 19, 2017

(54) NON-YELLOWING EASY-TO-CLEAN ANTIMICROBIAL PLASTIC

(71) Applicants: Uschi M. Graham, Lexington, KY (US); Bryan Livengood, Nicholasville, KY (US)

(72) Inventors: Uschi M. Graham, Lexington, KY (US); Bryan Livengood, Nicholasville, KY (US)

(73) Assignee: Topasol, LLC, Lexington, KY (US)

( * ) Notice: Subject to any disclaimer, the term of this patent is extended or adjusted under 35 U.S.C. 154(b) by 0 days.

(21) Appl. No.: 13/998,431

(22) Filed: Oct. 31, 2013

(65) Prior Publication Data

US 2014/0171546 A1    Jun. 19, 2014

Related U.S. Application Data

(60) Provisional application No. 61/796,005, filed on Oct. 31, 2012.

(51) Int. Cl.
*C08K 5/06* (2006.01)
*C08K 5/136* (2006.01)
*C08K 5/00* (2006.01)

(52) U.S. Cl.
CPC ............. *C08K 5/06* (2013.01); *C08K 5/136* (2013.01); *C08K 5/0058* (2013.01)

(58) Field of Classification Search
CPC ............ C08K 5/06; C08K 5/136; C08L 33/12
See application file for complete search history.

(56) References Cited

U.S. PATENT DOCUMENTS

| | | | | |
|---|---|---|---|---|
| 3,575,123 A | * | 4/1971 | Shepherd et al. | 114/67 R |
| 5,744,816 A | * | 4/1998 | Butler | C08F 8/30 |
| | | | | 252/182.18 |
| 2005/0276963 A1 | * | 12/2005 | Kim | C09J 7/0217 |
| | | | | 428/304.4 |
| 2009/0131571 A1 | * | 5/2009 | Fraser | C08F 20/12 |
| | | | | 524/431 |

* cited by examiner

*Primary Examiner* — Mark Kaucher
(74) *Attorney, Agent, or Firm* — Carrithers Law Office PLLC

(57) ABSTRACT

An additive that is incorporated into a thermoplastic acrylic pre-polymer formulation to render the polymer surface hydrophilic with easy cleanability and also making the surface antimicrobial. The additive is a hydrophilic reactive additive or ("HRA"), is incorporated with the other acrylic formulation components and polymerized into the acrylic polymer backbone. This reaction ensures that there will be no loss of hydrophilicity after repeated contact of the easy to clean acrylic sheet with water, as is typically happens with most sanitary ware products.

37 Claims, No Drawings

NON-YELLOWING EASY-TO-CLEAN ANTIMICROBIAL PLASTIC

CROSS-REFERENCE TO RELATED APPLICATIONS

This application claims priority from U.S. Provisional Application Ser. No. 61/796,005 filed on Oct. 31, 2012 and which is incorporated by reference in its entirety.

FIELD OF INVENTION

The present invention relates to high performance thermoplastic acrylics for sanitary wares applications. A novel high performance acrylic sheet for sanitary wares applications has been developed that is easy to clean due to its hydrophilic surface. Furthermore, its surface is antimicrobial and does not yellow, even when subject to high temperatures (e.g. 150-215° C.) as during a thermoforming operation.

BACKGROUND OF THE INVENTION

Acrylic materials are used in a wide variety of applications, including buildings, automotive lights, instrument dials, light diffusers, lenses, medical diagnostic devices, signs, and glazing. Acrylic polymers find extensive use in these applications because of their toughness, weatherability, appearance and stability characteristics. Common applications for acrylic compositions include production of sheets for eventual thermoforming into a variety of useful products including, for example, sanitary wares.

Acrylic polymers, including rigid sheets typically have a hydrophobic surface with a water contact angle between 70-80 degrees. Having a hydrophobic surface makes these materials difficult to clean. This is a concern for biomedical and sanitary wares applications.

Certain polymeric materials, e.g. polyvinyl chloride (PVC), polyurethane (PUR) and poly methyl methacrylate (PMMA), are susceptible to biological attack, especially from fungi. In order to reduce or prevent the degradation of plastics resulting from such biological attack, biocidal products have been developed for incorporation into plastics materials or paints to kill the fungi or bacteria responsible or prevent their proliferation.

PMMA and related acrylic copolymers have found widespread use in sanitary ware applications because of their low cost, their low weight compared with metals, and because of their excellent mechanical properties which includes toughness, scratch, and abrasion resistance. Nevertheless, there are some significant limitations of acrylic polymers for these types of applications, and also biomedical applications because of their hydrophobic nature and inability to resist bacteria and fungi growth.

It is known that if pure methyl methacrylate is polymerized, the volume it occupies will shrink typically by about 20% to about 22%. There are also exothermic effects and acceleration in the rate of polymerization which make the reaction difficult to control. Accordingly, it has become common commercially to pre-polymerize a portion of the monomer and prepare a solution of such pre-polymerized methyl methacrylate in additional monomer so the casting, or final polymerizing, process can be more readily controlled and its ultimate size and shape anticipated. Such casting, and stationary or cell casting, has been performed with minor amounts of other monomers in the methyl methacrylate, such as ethyl or butyl acrylate, di-unsaturated cross-linking agents, and the like.

Various organic and inorganic additives or fillers are and have been used in resinous articles for decorative, strength, fire-retardant, economic and other reasons. Pigments may be added for color, glass fibers for strength, aluminum trihydrate for fire retarding, and any inexpensive space-occupier for economic reasons mixtures are also described and a method of measuring swellability is given.

It may also be considered relevant to the background of this invention that impact resistance has been imparted to poly methyl methacrylate sheet and other products by incorporating into the acrylic sheet an effective amount of an impact modifier additive which is in the form of small beads or particles made of acrylic esters but also including butyl acrylate or other higher acrylate to form a rubbery component in the particle.

SUMMARY OF THE INVENTION

The present invention relates to an additive that is incorporated into a thermoplastic acrylic pre-polymer formulation to render the polymer surface hydrophilic with easy cleanability and also making the surface antimicrobial. The additive is a hydrophilic reactive additive or ("HRA"), is incorporated with the other acrylic formulation components and polymerized into the acrylic polymer backbone. This reaction ensures that there will be no loss of hydrophilicity after repeated contact of the easy to clean acrylic sheet with water, as is typically happens with most sanitary ware products.

One key component of the HRA is the hydrophilic reactive monomer which imparts the easy cleanability function to the acrylic sheet. Another key component of the HRA is the color stabilizing reactive monomer, which prevents the acrylic sheet from changing color during the high temperature thermoforming operation. Another key component of the HRA is the biocide compounds used to impart the antimicrobial surface. Several additional components may be added to assist with the hydrophilicity to improve the scratch and/or abrasion resistance of the acrylic sheet or optimize the compatibility of the various HRA components with the acrylic polymer formulation.

The present invention provides a thermoformable acrylic polymer sheet incorporating an HRA component providing a polymer that can be molded into sanitary ware products including bathtubs and shower trays. The new high performance acrylic polymer sheet as described is different in other developed thermoformable acrylic sheets in that it has an easy cleanable, hydrophilic surface that also has antimicrobial properties and excellent scratch resistance.

It is an object of the present invention to provide an acrylic polymer sheet that has an easy to clean surface due to its hydrophilicity with antimicrobial properties.

It is another object of the present invention to provide an easy to clean acrylic polymer that exhibits excellent toughness and scratch resistance and will not yellow even when subjected to high temperatures (e.g. 200° C.), such as during a thermoforming operation.

It is another object of the present invention to provide an additive used to render the acrylic sheet hydrophilic and antimicrobial.

Other objects, features, and advantages of the invention will be apparent with the following detailed description taken in conjunction with the accompanying drawings showing a preferred embodiment of the invention.

DETAILED DESCRIPTION OF THE PREFERRED EMBODIMENT

The hydrophilic reactive additive or ("HRA"), is the additive used to render the acrylic sheet hydrophilic and antimicrobial. This additive in incorporated into the acrylic polymer formulation in an amount between 2 and 30% by weight, specifically between 3 and 20% and more specifically between 3.5 and 15% by weight. This additive, known herein as "hydrophilic reactive additive" or HRA is added to the acrylic sheet formulation prior to polymerization. All of the ingredients in the HRA are compatible with the acrylic polymerization formulation and process.

The HRA reacts into the acrylic copolymer backbone during the polymerization process in order to stabilize the hydrophilic properties of the acrylic surface, even after repeated exposure to water, such as during the normal use of sanitary wares products. The HRA comprises two or more additives and typically consists of 3-6 different, but miscible compounds.

One or more of the components of the HRA are hydrophilic reactive monomers (HRM) that have the capability of reacting into an acrylic polymer's backbone at normal free radical polymerization conditions for example at 60° C. for 3 hours. There are many possible examples of hydrophilic reactive monomers including but not limited to: diacetone acrylamide, polyethylene glycol methacrylate, dimethyl amino methacrylate, dimethyl acrylamide, -vinyl pyrrolidone, 2-3-dihydroxypropyl acrylate, 3-hydroxyneopentyl methacrylate (NPGMA), 2,3-dihydroxylpropyl methacrylate, 3-hydroxyneopentyl acrylate (NPGA), and N-hydroxyethyl acrylamide and combinations thereof.

The HRMs are typically added to the acrylic sheet formulation in an amount of 1-25% by weight, specifically 2-20% by weight and more specifically 2.5-15%. The percentage of the HRMs in the hydrophilic reactive additive typically is between 20-90%, specifically between 30-85% and more specifically between 35-80%.

Most HRMs and their associated polymers and copolymers are not thermally stable under high temperatures such as 150-200° C. for 5-30 minutes and have the tendency to yellow when exposed to these high temperatures for this period of time or at lower temperatures over an extended period of time when using conventional polymer stabilizer incorporated in the polymer compounding process. One important aspect of this invention is that hydrophilicity can be obtained via addition of a hydrophilic reactive monomer without the change of color for the acrylic sheet, even when subject to high temperatures. This has been accomplished by the incorporation of a color stabilizing reactive monomer (CSRM) into the acrylic sheet formulation as part of the hydrophilic reactive additive mixture. There are several possible examples of CSRMs including but not limited to glycidyl methacrylate (GMA), hydroxyethyl methacrylate (HEMA), hydroxyethyl acrylate (HEA), hydroxypropyl acrylate (HPA) and hydroxypropyl methacrylate (HPMA) and combinations thereof. The incorporation of one or more CSRMs into the HRA in an effective amount to prevent yellowing results in the prevention of acrylic sheet yellowing after exposure to high temperatures. In the absence of a CSRM, the HRA containing acrylic sheet could easily see an increase in delta B and delta E or 1-5 units. With the incorporation of said color stabilizing reactive monomer, the delta B is held below 1.0 units even after exposure to 200° C. for 20 minutes.

Most HRMs and CSRMs have the propensity to react in the presence of each other when subject to light (visible, UV, IR) and/or heat (>30 deg C.). Polymerization inhibitors are typically used to prevent this premature polymerization or gelation reactions from occurring. The HRA may optionally include one or more polymerization inhibitors incorporated to prevent the gelation of the HRA during transit and/or storage. The polymerization inhibitors typically make up to 5% by wt. of the HRA, more preferably from 0.001-3% by wt. and more specifically 0.1-2% by wt. Examples of successful polymerization inhibitors that can be used in this application include but are not limited to: NaOH (sodium hydroxide), MEHQ (monomethyl Ether Hydroquinone), HQ (hydroquinone), KOH (potassium hydroxide), N—N'-di-sec-butyl-pphenylenediamine, KEROBIT, and combinations thereof.

In some cases, it is undesirable to use a polymerization inhibitor, as it may inhibit or alter the acrylic copolymer polymerization process. In this case, a polymerization inhibiting hydrophilic reactive monomer (PIHRM) may be added to the HRA to prevent gelation during transit or storage of the hydrophilic reactive additive formulation. The HRA may include one or more PIHRMs in the formulation and typically they make up to 25% by wt. of the HRA, more preferably from y 0.1-20% by wt. and more preferably from 1.0-15% by wt. Examples of successful PIHRMs that can be used in this application together or alone include but are not limited to: dimethyl acrylamide, N-hydroxyethyl acrylamide and diacetone acrylamide and combinations thereof.

In addition to the HRM, CSRM, and PIHRM, the hydrophilic reactive additive may comprise one or several ingredients used to render the acrylic polymer sheet surface antimicrobial. These biocidal compounds must be thermally stable and able to withstand the thermoforming temperature and time requirements without becoming ineffective or causing the acrylic sheet to yellow. Typically the biocidal compounds are present in the acrylic polymer in the amount of 300-10,000 ppm, specifically 500-8,000 ppm and more specifically 1000-7000 ppm. As one or more components of the hydrophilic reactive additive (HRA), the total biocide concentration is typically 2-20% by wt., specifically 4-15% by wt. and mores specifically 5-15% by wt. Examples of biocidal compounds that can be used by themselves or in combination as an ingredient of the HRA for the purpose of rendering the acrylic sheet surface antimicrobial include but are not limited to: 5-chloro-2-(2,4-dichlorophenoxy) phenol, (Triclosan), zinc pyrithione, sodium pyrithione, zinc oxide (ZnO), 1,2-benzoisothiazolin-3-one (BIT), N-butyl-1,2-benisohtianzolin-3-one (BBIT), 2-methylisothiazolin-3-one (MIT), silver, nanosilver, 2-methyl-1,2-benzisothiazolin-3 (2H)-one (MBIT), chloromethylisothiazolin-3-one (CMIT), and octylisothiazolinone (OIT) and combinations thereof.

The HRA may optionally include one or more surfactants used to improve the miscibility between the HRA components and/or the acrylic polymer formulation. The surfactants may be non-ionic, anionic or cationic and typically make up to 4% by wt. of the acrylic polymer sheet, more preferably from 0.01-3% by wt. and more preferably from 0.1-2% by wt. The concentration of the surfactants in the HRA is typically up to 20% by wt., and more preferably from 0.01-10% and more preferably from 0.1-8% by wt.

The HRA may also contain one or more metal oxide and metal oxide nanoparticle additives to improve the scratch and/or abrasion resistance of the acrylic sheet, including but not limited to silicon dioxide, aluminum oxide, titanium dioxide, zinc oxide and/or calcium carbonate and combinations thereof. Typically the concentration of nanoparticles or other metal oxide particles in the acrylic sheet is up to 4% by wt., more preferably from 0.01-3% by wt. and more preferably from 0.1-2% by weight. The concentration of these metal oxide particles in the HRA may be up to 20% by wt., more preferably between 0.1-14% and more preferably between 1.0-10% by weight.

The HRA composition may also include one or more different hydrophilic non-reactive additives including but not limited to polyethylene glycol (PEG) 200, PEG 300, PEG 400, PEG 600, glycerol ethoxylate, pentaerthrytol ethoxylate, polyethylene imine and/or polyacrylamide-co-acrylic acid and combinations thereof. Typical loadings for these non-reactive hydrophilic additives in the acrylic polymer sheet are up to 5% by wt., more preferably from 0.01-3% by wt. and more specifically 0.1-2% by weight. Typical concentrations of the non-reactive hydrophilic additive in the HRA formulation are up to 30% by wt., and more preferably from 0.1-25% and most preferably from 0.1-20%. By wt.

Acrylic particles of a relatively wide description may be used in the composition of the present invention. However, they should be made of primarily methyl methacrylate, i.e. the polymerizable portion of the ingredients should be at least about 80% weight methyl methacrylate, and should contain from 0 to 1.0% by wt. cross-linking agent. Fillers and pigments may be present as well in effective amounts.

The syrup should be rich in methyl methacrylate monomer. Normally, a casting syrup for clear or colored sheet products will contain about 50% to about 95% PMMA (including fillers) having a weight average molecular weight of about 150,000 to about 1,500,000. By "PMMA polymer" is meant substantially uncrosslinked polymer of methyl methacrylate having a weight average molecular weight of about 200,000 and having optionally small amounts (up to 10%) of other monomers therein, such as a lower alkyl acrylate, i.e. ethyl or butyl acrylate. In addition, 0.05 to 0.2% of peroxide initiators should be included as well. Pigments and fillers may also be employed within the discretion of the manufacturer in effective amounts to provide the desired properties.

In the present invention, the particles should have about 10% to about 50% by weight uncrosslinked polymer and about 0.1% to about 0.5% by wt. cross-linking agent in the PMMA, which will result in about 50% to about 90% crosslinked PMMA. Preferably, there will be about 20% to about 25% uncrosslinked polymer. Suitable crosslinking agents are known in the art and include ethylene glycol dimethacrylate, 1,3 butylene dimethacrylate, trimethylol propane trimethacrylate, and trimethylol propane triacrylate and combinations thereof.

The presence of the uncrosslinked polymer in the particles enhances the viscosity of the dispersion and helps to prevent the settling of particles. In addition, the relatively soluble polymer chains may migrate within or outside the particles. During the polymerization under conditions favoring sheet formation, the newly formed polymer chains become better entangled and interpenetrated with the structure of the existing polymer chains (both crosslinked and uncrosslinked) forming the particles. This provides an optimal bonding between the particles and the matrix, so that the sheets can be easily thermoformed using conventional techniques.

The MMA monomer is added to the syrup in a ratio of about 1:5 to about 1:50, and more preferably in a ratio of about 1:20 (monomer:syrup). The MMA monomer may contain small amounts, specifically less than about 5%, of other co-monomers, such as butyl acrylate and ethylene glycol dimethacrylate. In addition, the MMA monomer may further comprise additives such as initiators, e.g., organic peroxides; chain transfer agents, e.g., dodecylmercaptan; and colorants and stabilizers such as titanium dioxide and carbon black, or initiators such as t-amyl peroxy neodecanoate, t-butyl peroxyneoheptanoate, t-amyl peroxypivalate, t-butyl peroxypivalate, di-isononanoyl peroxide, di-decanoyl peroxide, t-amyl peroxy-2-ethylhexanoate, t-butyl peroxy-2-ethylhexanoate, 2;2'-Azobis(2,4-Dimethylvaleronitrile), 2,2'-Azobis(2-Methylbutyronitrile), 1,1'-Azobis (Cyanocyclohexane), and combinations thereof.

Typically, the uncured polymer matrix has a viscosity of at least 300 centipoise (cP), and preferably at least 400 cP. However, the viscosity of the uncured polymer matrix is typically less than 5000 cP, and may be less than 3500 cP. The density of the uncured polymer matrix is usually less than 1.4 grams per milliliter (g/ml), for example, less than 1.2 g/ml. However, the density of the polymer matrix of the present invention is usually greater than 0.70 g/ml, and usually greater than 0.9 g/ml.

If color and increased opacity is desired in the final sheet product, various colorants or fillers prior to the polymerization. Suitable colorants include pigments and dyes, such as carbon black, titanium dioxide, iron oxide tan, iron oxide red, chrome yellow, anthraquinone red, quinacridone red, phthalocyanine blue, mica, and combinations thereof. Preferably, the colorants of the present invention comprise between 0.1 and 5.0 percent of the weight of the surface-seeking particle, and more preferably between 0.5 and 3.0 percent by weight.

The acrylic sheet of the present invention is an acrylic sheet containing particles homogeneously dispersed in a resin matrix which does not substantially contain air bubbles and has an air bubble content of not more than 10% by volume. The mixture can also be subject to defoaming so that the air bubble content becomes not more than 10% by volume based on the amount of the resin in the mixture, followed by casting of the defoamed mixture;

The acrylic compositions can be made by conventional free radical, anionic or other polymerization techniques, for example bulk, solution or suspension with the addition of suitable initiators and optionally chain transfer agents and/or other additives such as cross-linking additives, fillers, pigments, plasticizers, impact modifiers, stabilizers etc. Therefore the monomer(s) are caused to polymerize by initiating the polymerization reaction, normally by means of activating the added initiator, and maintaining suitable conditions, e.g. an elevated temperature, pressure etc until the required degree of polymerization has been achieved. Such methods are already very well known to the skilled person and a large number of such methods exist in the art. As one preferred option, free-radical polymerization is used, e.g. in a bulk polymerization process used in the well-known cell-casting method of manufacturing high molecular weight acrylic sheets in which a (mixture of) polymerizable monomer(s), optionally with polymer dissolved therein to form a syrup, is mixed with an initiator or mixture of initiators and other additives and filled either into the gap between two glass plates which are separated by a gasket or into a bag or other mould. The polymerization reaction is then thermally initiated and the polymer allowed to form and cure at elevated temperature. The acrylic composition of the present invention may be in the form of sheets, which may be suitable for shaping by e.g. (thermoforming), The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

HYDROPHILIC REACTIVE ADDITIVE (HRA) EXAMPLE 1

375 grams of polyethylene glycol methyl ether acrylate from Sigma Aldrich was mixed with 375 grams of polyethylene glycol 300 (PEG 300) from Sigma Aldrich and 100 grams of 5-chloro-2-(2,4-dichlorophenoxy)phenol (Triclosan) from Sigma Aldrich in an IKA Ultra-Turrax T50 homogenizer at 5200 rpm for 5 minutes.

50 grams of the above mixture was added at 5% concentration by weight to an acrylic polymer mixture consisting of 850 grams of acrylate pre-polymer syrup.

Preparation of Syrup (or Matrix): A Syrup was prepared by partial polymerization of the ingredients set forth below:
838 grams Syrup: (96% Methyl Methacrylate, 4% Butyl acrylate)
5.0 grams Esperox 33M (t-butyl peroxyneodecanoate)
0.5 grams Vazo 64 (2,2'-azobis-(isobutyronitrile))
2.5 grams Ethylene glycol dimethacrylate
2.5 grams Lauryl Mercaptan
1.0 Tinuvin P (2-(2' hydroxy-5'-methyl phenyl) benzotriazole)

These ingredients were mixed for 60 minutes at 20.degree. C. and 40 mm Hg absolute pressure. Viscosity of the mixture was approximately 1000 cP.

To the solution were also added other ingredients, to obtain the proper polymerization rate and overall cure after the swelling process is completed. These ingredients were 0.46 gr. of N-dodecyl mercaptan, 1.75 gr. of Decanox F (decanoyl peroxide), 0.46 grams of tri-isooctyl phosphite and 0.011 gr. of Zelec UN (DuPont registered trademark) as release agents. Also added were 20 grams of titanium dioxide based pigment dispersion in dibutyl phthalate (50:50 ratio). The remaining 80 grams were methyl methacrylate monomer.

Casting and Molding: The syrup and particle mixture were mixed for 20 minutes. The suspension was then poured into a cell formed by two opposing 14 inches.times.14 inches glass plates, spaced to a uniform distance of 0.224 inches by PVC tubing at the perimeter. After the cell was sealed, it was immersed in hot water maintained at 60 deg C. for 180 minutes and the curing was then completed in an air circulated oven, for 180 minutes at 120 degree. C. After cooling, the cell was disassembled, obtaining a glossy, smooth, void-free acrylic sheet of 5 mm thickness.

HYDROPHILIC REACTIVE ADDITIVE (HRA) EXAMPLE 2

A $2^{nd}$ HRA sample was prepared the same as in Example 1 except in the particle mixture was formed from the ingredients set forth below:
250 grams of polyethylene glycol methacrylate (Mn=300 g/mole) from Sigma Aldrich
500 grams of polyethylene glycol 300 (PEG 300) from Sigma Aldrich and
100 grams of 5-chloro-2-(2,4-dichlorophenoxy) phenol (Triclosan) from Sigma

HYDROPHILIC REACTIVE ADDITIVE (HRA) EXAMPLE 3

A $3^{rd}$ HRA sample was prepared the same as in Example 1 except in the particle mixture was formed from the ingredients set forth below:
550 grams of N-Vinyl pyrrolidone (amine stabilized) from BASF
200 grams of polyethylene glycol 300 (PEG 300) from Sigma Aldrich and
100 grams of 5-chloro-2-(2,4-dichlorophenoxy) phenol (Triclosan) from Sigma

HYDROPHILIC REACTIVE ADDITIVE (HRA) EXAMPLE 4

A $4^{th}$ HRA sample was prepared the same as in Example 1 except in the particle mixture was formed from the ingredients set forth below:
580 grams of N-Vinyl pyrrolidone (amine stabilized) from BASF
185 grams of Glycidyl methacrylate (GMA) (MEHQ stabilized) from Dow Chemical
85 grams of N-butyl-1,2-benziosthiazolin-3-one (BBIT) from Lonza

HYDROPHILIC REACTIVE ADDITIVE (HRA) EXAMPLE 5

A $5^{th}$ HRA sample was prepared the same as in Example 1 except in the particle mixture was formed from the ingredients set forth below:
385 grams of N-Vinyl pyrrolidone (amine stabilized) from BASF
385 grams of Glycidyl methacrylate (GMA) (MEHQ stabilized) from Dow Chemical
80 grams of N-butyl-1,2-benziosthiazolin-3-one (BBIT) from Lonza

HYDROPHILIC REACTIVE ADDITIVE (HRA) EXAMPLE 6

A $6^{th}$ HRA sample was prepared the same as in Example 1 except in the particle mixture was formed from the ingredients set forth below:
580 grams of N-Vinyl pyrrolidone (caustic stablized) from BASF
185 grams of Glycidyl methacrylate (GMA) (MEHQ stabilized) from Dow Chemical
85 grams of N-butyl-1,2-benziosthiazolin-3-one (BBIT) from Lonza

HYDROPHILIC REACTIVE ADDITIVE (HRA) EXAMPLE 7

A $7^{th}$ HRA sample was prepared the same as in Example 1 except in the particle mixture was formed from the ingredients set forth below:
580 grams of N-Vinyl pyrrolidone (caustic stablized) from BASF
185 grams of Glycidyl methacrylate (GMA) (MEHQ stabilized) from Dow Chemical
45 grams of N-butyl-1,2-benziosthiazolin-3-one (BBIT) from Lonza 40 grams of 5-chloro-2-(2,4-dichlorophenoxy) phenol (Triclosan) from Sigma

HYDROPHILIC REACTIVE ADDITIVE (HRA) EXAMPLE 8

A 8th HRA sample was prepared the same as in Example 1 except in the particle mixture was formed from the ingredients set forth below:
580 grams of N-Vinyl pyrrolidone (caustic stablized) from BASF
185 grams of Glycidyl methacrylate (GMA) (MEHQ stabilized) from Dow Chemical
75 grams of N-butyl-1,2-benziosthiazolin-3-one (BBIT) from Lonza
15 grams of Zinc Omadine (ZPT) from Lonza

HYDROPHILIC REACTIVE ADDITIVE (HRA) EXAMPLE 9

A 9th HRA sample was prepared the same as in Example 1 except in the particle mixture was formed from the ingredients set forth below:
765 grams of N-Vinyl pyrrolidone (caustic stablized) from BASF
85 grams of Zinc Omadine (ZPT) from Lonza

HYDROPHILIC REACTIVE ADDITIVE (HRA) EXAMPLE 10

A 10th HRA sample was prepared the same as in Example 1 except in the particle mixture was formed from the ingredients set forth below:
615 grams of N-Vinyl pyrrolidone (caustic stablized) from BASF
150 grams of Diacetone Acrylamide (DAAM) from Nippon Kasei Chemical
85 grams of N-butyl-1,2-benziosthiazolin-3-one (BBIT) from Lonza

HYDROPHILIC REACTIVE ADDITIVE (HRA) EXAMPLE 11

A 11th HRA sample was prepared the same as in Example 1 except in the particle mixture was formed from the ingredients set forth below:
550 grams of N-Vinyl pyrrolidone (caustic stablized) from BASF
130 grams of Glycidyl methacrylate (GMA) (MEHQ stabilized) from Dow Chemical
85 grams of Diacetone Acrylamide (DAAM) from Nippon Kasei Chemical
85 grams of N-butyl-1,2-benziosthiazolin-3-one (BBIT) from Lonza

HYDROPHILIC REACTIVE ADDITIVE (HRA) EXAMPLE 12

A 12th HRA sample was prepared the same as in Example 1 except in the particle mixture was formed from the ingredients set forth below:
550 grams of N-Vinyl pyrrolidone (caustic stablized) from BASF
130 grams of Glycidyl methacrylate (GMA) (MEHQ stabilized) from Dow Chemical
85 grams of Diacetone Acrylamide (DAAM) from Nippon Kasei Chemical
45 grams of N-butyl-1,2-benziosthiazolin-3-one (BBIT) from Lonza
40 grams of 5-chloro-2-(2,4-dichlorophenoxy) phenol (Triclosan) from Sigma

HYDROPHILIC REACTIVE ADDITIVE (HRA) EXAMPLE 13

A 13th HRA sample was prepared the same as in Example 1 except in the particle mixture was formed from the ingredients set forth below:
575 grams of N-Vinyl pyrrolidone (caustic stablized) from BASF
150 grams of Glycidyl methacrylate (GMA) (MEHQ stabilized) from Dow Chemical
45 grams of Diacetone Acrylamide (DAAM) from Nippon Kasei Chemical
85 grams of N-butyl-1,2-benziosthiazolin-3-one (BBIT) from Lonza

HYDROPHILIC REACTIVE ADDITIVE (HRA) EXAMPLE 14

A 14th HRA sample was prepared the same as in Example 1 except in the particle mixture was formed from the ingredients set forth below:
470 grams of N-Vinyl pyrrolidone (caustic stablized) from BASF
300 grams of Hydroxypropyl Acrylate (Bisomer HPA) (MEHQ stabilized) from Cognis
80 grams of Zinc Omadine (ZPT) from Lonza

HYDROPHILIC REACTIVE ADDITIVE (HRA) EXAMPLE 15

A 15th HRA sample was prepared the same as in Example 1 except in the particle mixture was formed from the ingredients set forth below:
470 grams of N-Vinyl pyrrolidone (caustic stablized) from BASF
300 grams of Hydroxyethyl Acrylate (Bisomer HEA) (MEHQ stabilized) from Cognis
80 grams of Zinc Omadine (ZPT) from Lonza

HYDROPHILIC REACTIVE ADDITIVE (HRA) EXAMPLE 16

A 16th HRA sample was prepared the same as in Example 1 except in the particle mixture was formed from the ingredients set forth below:
470 grams of N-Vinyl pyrrolidone (caustic stablized) from BASF
300 grams of Hydroxyethyl methacrylate (Bisomer HEMA) (MEHQ stabilized) from Cognis
80 grams of Zinc Omadine (ZPT) from Lonza

HYDROPHILIC REACTIVE ADDITIVE (HRA) EXAMPLE 17

A 17th HRA sample was prepared the same as in Example 1 except in the particle mixture was formed from the ingredients set forth below:
470 grams of N-Vinyl pyrrolidone (caustic stablized) from BASF
300 grams of Hydroxypropyl methacrylate (Bisomer HPMA) (MEHQ stabilized) from Cognis
80 grams of Zinc Omadine (ZPT) from Lonza

HYDROPHILIC REACTIVE ADDITIVE (HRA) EXAMPLE 18

A 18$^{th}$ HRA sample was prepared the same as in Example 1 except in the particle mixture was formed from the ingredients set forth below:

765 grams of N-Vinyl pyrrolidone (caustic stablized) from BASF 85 grams of N-butyl-1,2-benziosthiazolin-3-one (BBIT) from Lonza

HYDROPHILIC REACTIVE ADDITIVE (HRA) EXAMPLE 19

A 19$^{th}$ HRA sample was prepared the same as in Example 1 except in the particle mixture was formed from the ingredients set forth below:

765 grams of N-Vinyl pyrrolidone (caustic stablized) from BASF 42.5 grams of N-butyl-1,2-benziosthiazolin-3-one (BBIT) from Lonza 42.5 grams of Zinc Omadine (ZPT) from Lonza

HYDROPHILIC REACTIVE ADDITIVE (HRA) EXAMPLE 20

A 20$^{th}$ HRA sample was prepared the same as in Example 1 except in the particle mixture was formed from the ingredients set forth below:

765 grams of N-Vinyl pyrrolidone (caustic stablized) from BASF 85 grams of 5-chloro-2-(2,4-dichlorophenoxy) phenol (Triclosan) from Sigma

HYDROPHILIC REACTIVE ADDITIVE (HRA) EXAMPLE 21

A 21$^{st}$ HRA sample was prepared the same as in Example 1 except in the particle mixture was formed from the ingredients set forth below:

580 grams of N-Vinyl pyrrolidone (caustic stablized) from BASF 185 grams of Glycidyl methacrylate (GMA) (MEHQ stabilized) from Dow Chemical 20 grams of N-butyl-1,2-benziosthiazolin-3-one (BBIT) from Lonza 65 grams of Zinc Oxide (ZnO) from Sigma Aldrich

HYDROPHILIC REACTIVE ADDITIVE (HRA) EXAMPLE 22

A 22$^{nd}$ HRA sample was prepared the same as in Example 1 except in the particle mixture was formed from the ingredients set forth below:

580 grams of N-Vinyl pyrrolidone (caustic stablized) from BASF 185 grams of Glycidyl methacrylate (GMA) (MEHQ stabilized) from Dow Chemical 65 grams of N-butyl-1,2-benziosthiazolin-3-one (BBIT) from Lonza 20 grams of Zinc Oxide (ZnO) from Sigma Aldrich

HYDROPHILIC REACTIVE ADDITIVE (HRA) EXAMPLE 23

A 23$^{rd}$ HRA sample was prepared the same as in Example 1 except in the particle mixture was formed from the ingredients set forth below:

400 grams of N-Vinyl pyrrolidone (caustic stablized) from BASF 365 grams of Diacetone Acrylamide (DAAM) from Nippon Kasei Chemical 85 grams of N-butyl-1,2-benziosthiazolin-3-one (BBIT) from Lonza The following Table 1 shows the performance of the various HRA formulations with respect to easy cleanability, yellowing, antimicrobial performance, etc.

TABLE 1

Hydrophilic Reactive Additive Formulation Performance in Acrylic Sheet Application

| Example # | Surface Appearance | Yellowing/Discoloration Tendency Before Thermoform | Yellowing/Discoloration Tendency After Thermoform | Easy Cleanability/ Hydrophilicity Before Thermoform | Easy Cleanability/ Hydrophilicity After Thermoform | Acrylic Polymer Softening Point Drop (Plasticize) | Antimicrobial Performance Before Thermoform | Antimicrobial Performance After Thermoform | Residual Monomer % |
|---|---|---|---|---|---|---|---|---|---|
| 1 | + | + | + | + | ○ | - | + | ○ | - |
| 2 | + | + | + | + | ○ | -- | + | ○ | - |
| 3 | - | ○ | - | + | ○ | - | + | ○ | + |
| 4 | - | ○ | ○ | ++ | + | ○ | + | + | ○ |
| 5 | ○ | + | + | + | ○ | ○ | + | + | - |
| 6 | + | + | ○ | ++ | + | ○ | + | + | ○ |
| 7 | + | + | ○ | ++ | + | ○ | + | ○ | ○ |
| 8 | + | + | - | ++ | + | - | ++ | + | ○ |
| 9 | + | ○ | -- | ++ | + | - | ++ | + | ○ |
| 10 | + | ○ | - | ++ | + | ○ | + | + | ○ |
| 11 | + | + | ○ | + | + | ○ | + | + | ○ |
| 12 | + | + | ○ | + | + | ○ | + | ○ | ○ |
| 13 | + | + | ○ | ++ | + | ○ | + | + | ○ |
| 14 | + | + | - | + | ○ | - | ++ | + | ○ |
| 15 | + | + | - | + | ○ | - | ++ | + | - |
| 16 | + | + | - | + | ○ | - | ++ | + | ○ |
| 17 | + | + | - | + | ○ | - | ++ | + | ○ |
| 18 | + | ○ | - | ++ | + | ○ | + | + | ○ |
| 19 | + | ○ | -- | ++ | + | - | ++ | + | ○ |
| 20 | + | ○ | - | ++ | + | ○ | + | ○ | ○ |
| 21 | ○ | + | + | ++ | + | ○ | + | + | ○ |

TABLE 1-continued

Hydrophilic Reactive Additive Formulation Performance in Acrylic Sheet Application

| Example # | Surface Appearance | Yellowing/Discoloration Tendency | | Easy Cleanability/ Hydrophilicity | | Acrylic Polymer Softening Point Drop (Plasticize) | Antimicrobial Performance | | Residual Monomer % |
|---|---|---|---|---|---|---|---|---|---|
| | | Before Thermoform | After Thermoform | Before Thermoform | After Thermoform | | Before Thermoform | After Thermoform | |
| 22 | − | + | + | ++ | + | ○ | ○ | ○ | ○ |
| 23 | + | ○ | − | + | + | ○ | + | + | ○ |

KEY ++ Excellent + Good ○ Acceptable − Poor −− Very Poor

We claim:

1. An acrylic copolymer composition, including:
a partially polymerized syrup comprising from 50 to 96 wt. % of a poly(methyl methacrylate), PMMA, including fillers and a methyl methacrylate (MMA) containing from about 10 to about 50 wt. % of an uncrosslinked polymer, said PMMA including up to 10 wt. % of a lower alkyl acrylate comprising an ethyl acrylate and a butyl acrylate, and a cross-linking agent selected from the group consisting of ethylene glycol dimethacrylate, 1,3 butylene dimethacrylate, trimethylol propane trimethacrylate, trimethylol propane triacrylate, and combinations thereof in an amount of up to 1.0 wt. %, and from about 0.05 to about 0.2% of at least one peroxide initiator;
a hydrophilic reactive additive (HRA), in an effective amount of from 1-25 wt. %;
said hydrophilic reactive additive (HRA) comprising a hydrophilic reactive monomer (HRM) selected from the group consisting of diacetone acrylamide, polyethylene glycol methacrylate, dimethyl amino methacrylate, dimethyl acrylamide, N-vinyl pyrrolidone, 2-3-dihydroxypropyl acrylate, 3-hydroxyneopentyl methacrylate (NPGMA), 2,3-dihydroxylpropyl methacrylate, 3-hydroxyneopentyl acrylate (NPGA), N-hydroxyethyl acrylamide, and combinations thereof in an amount of from 2 to 90 wt. % of said hydrophilic reactive additive (HRA);
said hydrophilic reactive additive (HRA) including a color stabilizing reactive monomer selected from the group consisting of glycidyl methacrylate (GMA), hydroxyethyl methacrylate (HEMA), hydroxyethyl acrylate (HEA), hydroxypropyl acrylate (HPA), hydroxypropyl methacrylate (HPMA), and combinations thereof in an effective amount of from 15.3 to 45.3 wt. % of said hydrophilic reactive additive (HRA);
said hydrophilic reactive additive (HRA) including at least one polymerization inhibitor selected from the group consisting of sodium hydroxide, monomethyl ether hydroquinone, hydroquinone, potassium hydroxide, N—N'-di-sec-butyl-phenylenediamine, and combinations thereof in an effective amount of up to 5% by wt.; and
said hydrophilic reactive additive including a biocide including compound selected from the group consisting 5-chloro-2-(2,4-dichlorophenoxy) phenol, zinc pyrithione, sodium pyrithione, zinc oxide (ZnO), 1,2-benzoisothiazolin-3-one (BIT), N-butyl-1,2-benisohtianzolin-3-one, 2-methyl-1,2-benzisothiazolin-3(2H)-one, silver compound, nano-silver compound, 2-methyl-1,2-benziosthiazolin-3(2H)-one, chloromethylisothiazolin-3-one, octylisothiazolinone, and combinations thereof in an effective amount of from between 2-20% by wt.

2. The acrylic copolymer composition of claim 1, said hydrophilic reactive additive (HRA) including a non-ionic, anionic or cationic surfactant in said hydrophilic additive in an effective amount up to 20 wt. % of said hydrophilic reactive additive (HRA).

3. The acrylic copolymer composition of claim 1, said hydrophilic reactive additive (HRA) including a non-ionic, anionic or cationic surfactant in said hydrophilic additive in an effective amount of from 0.01-10 wt. % of said hydrophilic reactive additive (HRA).

4. The acrylic copolymer composition of claim 1, further including a said hydrophilic reactive additive (HRA) including a non-ionic, anionic or cationic surfactant in said hydrophilic additive in an effective amount of from 0.1-8 wt. % of said hydrophilic reactive additive (HRA).

5. The acrylic copolymer composition of claim 1, said hydrophilic reactive additive (HRA) including at least one metal oxide or metal oxide nanoparticle additive selected from the group consisting of silicon dioxide, aluminum oxide, titanium dioxide, inc oxide, calcium carbonate, and combinations thereof in an amount up to 20 wt. % of said hydrophilic reactive additive (HRA).

6. The acrylic copolymer composition of claim 1, said hydrophilic reactive additive (HRA) including at least one metal oxide or metal oxide nanoparticle additive selected from the group consisting of silicon dioxide, aluminum oxide, titanium dioxide, zinc oxide, calcium carbonate, and combinations thereof in an effective amount of between 0.1-14 wt. % of said hydrophilic reactive additive (HRA).

7. The acrylic copolymer composition of claim 1, said hydrophilic reactive additive (HRA) including at least one metal oxide or metal oxide nanoparticle additive selected from the group consisting of silicon dioxide, aluminum oxide, titanium dioxide, zinc oxide, calcium carbonate, and combinations thereof in an amount of between 1.0-10 wt. % of said hydrophilic reactive additive (HRA).

8. The acrylic copolymer composition of claim 1, said hydrophilic reactive additive (HRA) including at least one hydrophilic non-reactive additive selected from the group consisting of polyethylene glycol (PEG) 200, PEG 300, PEG 400, PEG 600, glycerol ethoxylate, pentaerthrytol ethoxylate, polyethylene imine, polyacrylamide-co-acrylic acid, and combinations thereof in an effective amount of up to 30 wt. % of said hydrophilic reactive additive (HRA).

9. The acrylic copolymer composition of claim 1, said hydrophilic reactive additive (HRA) including at least one hydrophilic non-reactive additive selected from the group consisting of polyethylene glycol (PEG) 200, PEG 300, PEG 400, PEG 600, glycerol ethoxylate, pentaerthrytol ethoxylate, polyethylene imine, polyacrylamide-co-acrylic acid, and combinations thereof in an effective amount of from 0.1-20 wt. % of said hydrophilic reactive additive (HRA).

10. The acrylic copolymer composition of claim 1, said hydrophilic reactive additive (HRA) including at least one hydrophilic non-reactive additive in an amount of 2-20 wt. % of said hydrophilic reactive additive (HRA) added to an acrylic sheet formulation prior to polymerization under conditions favoring casting sheet formation at a temperature of between 150 to 215° C.

11. The acrylic copolymer composition of claim 1, said hydrophilic reactive additive (HRA) including at least one hydrophilic non-reactive additive in an amount of 2.5-15 wt. % of said hydrophilic reactive additive (HRA) added to an acrylic sheet formulation prior to polymerization under conditions favoring casting sheet formation at a temperature of between 150 to 215° C.

12. The acrylic copolymer composition of claim 1, wherein said hydrophilic reactive monomer is present in an amount of from 2 to 90 percent by weight of said hydrophilic reactive additive (HRA).

13. The acrylic copolymer composition of claim 1, wherein said hydrophilic reactive monomer is present in an amount of from 30 to 85 percent by weight of said hydrophilic reactive additive (HRA).

14. The acrylic copolymer composition of claim 1, said hydrophilic reactive additive (HRA) including colorant selected from the group consisting of carbon black, titanium dioxide, iron oxide tan, iron oxide red, chrome yellow, anthraquinone red, quinacridone red, phthalocyanine blue, mica, and combinations thereof in an effective amount of between 0.1 and 5.0 percent of the weight of said hydrophilic reactive additive (HRA).

15. An acrylic copolymer composition comprising:
a pre-polymerized methyl methacrylate monomer comprising a partially polymerized syrup comprising from 50 to 95 wt. % of a poly(methyl methacrylate), PMMA including fillers and a methyl methacrylate (MMA) containing from about 10 to about 50 wt. % of an uncross-linked polymer, and said PMMA including up to 10 wt. % of a lower alkyl acrylate comprising an ethyl acrylate and a butyl acrylate, and a cross-linking agent selected from the group consisting of ethylene glycol dimethacrylate, 1,3 butylene dimethacrylate, trimethylol propane trimethacrylate, trimethylol propane triacrylate, and combinations thereof in an amount of up to 1.0 wt. %, and from about 0.05 to 0.2 wt. % of at least one peroxide initiator;
a hydrophilic reactive additive (HRA) in an effective amount of from 1-25 wt. %;
said hydrophilic reactive additive (HRA) comprising a hydrophilic reactive monomer (HRM) selected from the group consisting of diacetone acrylamide, polyethylene glycol methacrylate, dimethyl amino methacrylate, dimethyl acrylamide, -vinyl pyrrolidone, 2-3-dihydroxypropyl acrylate, 3-hydroxyneopentil methacrylate (NPGMA), 2,3-dihydroxylpropyl methacrylate, 3-hydroxyneopentyl acrylate (NPGA), N-hydroxyethyl acrylamide, and combinations thereof in an amount of from 2 to 90 wt. % of said hydrophilic reactive additive (HRA);
said hydrophilic reactive additive (HRA) including a color stabilizing reactive monomer selected from the group consisting of glycidyl methacrylate (GMA), hydroxyethyl methacrylate (HEMA), hydroxyethyl acrylate (HEA), hydroxypropyl acrylate (HPA), hydroxypropyl methacrylate (HPMA), and combinations thereof in an effective amount of from 15.3 to 45.3 wt. % of said hydrophilic reactive additive (HRA) to prevent yellowing of said acrylic copolymer; and
said hydrophilic reactive additive (HRA) including a biocide compound selected from the group consisting of 5-chloro-2-(2,4-dichlorophenoxy), phenol, zinc pyrithione, sodium pyrithione, zinc oxide (ZnO), 1,2-benzoisothiazolin-3-one (BIT), N-butyl-1,2-benziosthiazolin-3-one, 2-methylisothiazolin-3-one, silver compound, nano-silver compound, 2-methyl-1,2-benziosthiazolin-3(2H)-one, chloromethylisothiazolin-3-one, octylisothiazolinone, and combinations thereof in an effective amount of from between 2-20% by wt.

16. The acrylic copolymer composition of claim 15, wherein said hydrophilic reactive additive (HRA) further comprises at least one polymerization inhibitor selected from the group consisting of sodium hydroxide, monomethyl ether hydroquinone, hydroquinone, potassium hydroxide, N—N'-di-sec-butyl-pphenylenediamine, and combinations thereof in an amount of up to 5 wt. % of said hydrophilic reactive additive (HRA).

17. The acrylic copolymer composition of claim 16, said hydrophilic reactive additive (HRA) including at least one metal oxide or metal oxide nanoparticle additive selected from the group consisting of silicon dioxide, aluminum oxide, titanium dioxide, zinc oxide, calcium carbonate, and combinations thereof in an amount up to 20 wt. % of said hydrophilic reactive additive (HRA).

18. The acrylic copolymer composition of claim 16, said hydrophilic reactive additive (HRA) including at least one hydrophilic non-reactive additive selected from the group consisting of polyethylene glycol (PEG) 200, PEG 300, PEG 400, PEG 600, glycerol ethoxylate, pentaerthrytol ethoxylate, polyethylene imine, polyacrylamide-co-acrylic acid, and combinations thereof in an effective amount of from 0.1-25 wt. % of said hydrophilic reactive additive (HRA).

19. An antimicrobial acrylic copolymer formulation comprising:
a partially polymerized syrup comprising from 50 to 96 wt. % of a poly(methyl methacrylate), PMMA including fillers and a methyl methacrylate (MMA) containing from about 10 to about 50 wt. % of an uncross-linked polymer, said PMMA including up to 10 wt. % of lower alkyl acrylates, and a cross-linking agent selected from the group consisting of ethylene glycol dimethacrylate, 1,3 butylene dimethacrylate, trimethylol propane trimethacrylate, trimethylol propane triacrylate, and combinations thereof in an amount of up to 1.0 wt. % of said syrup;
a hydrophilic reactive additive (HRA) in an amount of from 3-15 wt. % of said syrup is added to said partially polymerized syrup;
a) said hydrophilic reactive additive (HRA) comprising a hydrophilic reactive monomer (HRM) selected from the group consisting of diacetone acrylamide, polyethylene glycol methacrylate, dimethyl amino methacrylate, dimethyl acrylamide, -vinyl pyrrolidone, 2-3-dihydroxypropyl acrylate, 3-hydroxyneopentil methacrylate (NPGMA), 2,3-dihydroxylpropyl methacrylate, 3-hydroxyneopentyl acrylate (NPGA), N-hydroxyethyl acrylamide, N-vinyl pyrrolidone, and combinations thereof in an amount of from 35 tp 80 weight percent of said hydrophilic reactive additive (HRA);
b) said hydrophilic reactive additive (HRA) including a color stabilizing reactive monomer selected from the group consisting of glycidyl methacrylate (GMA), hydroxyethyl methacrylate (HEMA), hydroxyethyl acrylate (HEA), hydroxypropyl acrylate (HPA), hydroxypropyl methacrylate (HPMA), and combinations thereof in an effective amount of from 15.3 to 45.3 wt. % of said hydrophilc reactive additive (HRA);

c) said hydrophilic reactive additive (HRA) including a biocide compound selected from the group consisting of 5-chloro-2-(2,4-dichlorophenoxy) phenol, zinc pyrithione, sodium pyrithione, zinc oxide (ZnO), 1,2-benzoisothiazolin-3-one (BIT), n-butyl-1,2-benziosthiazolin-3-one, zinc omadine, 2-methylisothiazolin-3-one, silver compound, nano-silver compound, 2-methyl-1,2-benziosthiazolin-3(2H)-one, chloromethylisothiazolin-3-one, octylisothiazolinone, and combinations thereof in an effective amount of from between 2-20% wt. % of said hydrophilic reactive additive (HRA); and said antimicrobial acrylic polymer having a resistance to yellowing upon subjection to a temperature ranging from 150 to 215° C.

20. The antimicrobial acrylic copolymer composition of claim 19, wherein said methyl methacrylate comprises 96 wt. % of said syrup.

21. The antimicrobial acrylic copolymer composition of claim 19, wherein said butyl acrylate comprises 4 wt. % of said syrup.

22. The antimicrobial acrylic copolymer composition of claim 19, said partially polymerized syrup including an effective amount of additives selected from the group consisting of t-butyl peroxyneodecanoate, 2,2'-azobis-isobutyronitrile, ethylene glycol dimethacrylate, lauryl mercaptan, and 2-(2"hydroxy-5"-methyl phenyl) benzotriazole.

23. The antimicrobial acrylic copolymer composition of claim 19, further comprising an effective amount of a n-dodecyl mercaptan, a decanoyl peroxide, a tri-isocytle phosphite, a titanium dioxide/di-butyl phthalate, and combinations thereof.

24. The antimicrobial acrylic copolymer composition of claim 19, said hydrophilic reactive additive (HRA) including at least one polymerization inhibitor selected from the group consisting of sodium hydroxide, monomethyl ether hydroquinone, hydroquinone, potassium hydroxide, N—N'-di-sec-butyl-pphenylenediamine, and combinations thereof in an effective amount of up to 5 wt. % of said hydrophilic reactive additive (HRA).

25. The antimicrobial acrylic copolymer composition of claim 19, including a hydrophilic reactive monomer (PIHRM) added to said hydrophilic reactive additive (HRA), selected from the group consisting of dimethyl acrylamide, N-hydroxyethyl acrylamide, diacetone acrylamide and combinations thereof in an amount of up to 25 wt. % of said hydrophilic reactive additive (HRA).

26. The acrylic copolymer composition of claim 1, wherein said MMA is added to said partially polymerized syrup in a ratio of about 1:5 to about 1:50 by weight.

27. The acrylic copolymer composition of claim 17, wherein said MMA is added to said partially polymerized syrup in a ratio of about 1:5 to about 1:50 by weight.

28. The acrylic copolymer composition of claim 19, wherein said MMA is added to said partially polymerized syrup in a ratio of about 1:5 to about 1:50 by weight.

29. The acrylic copolymer composition of claim 1, wherein said MMA is added to said partially polymerized syrup in a ratio of about 1:20 by weight.

30. The acrylic copolymer composition of claim 17, wherein said MMA is added to said partially polymerized syrup in a ratio of about 1:20 by weight.

31. The acrylic copolymer composition of claim 19, wherein said MMA is added to said partially polymerized syrup in a ratio of about 1:20 by weight.

32. The acrylic copolymer composition of claim 1, wherein said MMA contains up to 5 wt. % of additives selected from the group consisting of butyl acrylate, ethylene glycol dimethacrylate, dodecylmercaptan, a colorant, titanium dioxide, carbon black, t-amyl peroxy neodecanoate, t-butyl peroxyneoheptanoate, t-amyl peroxypivalate, t-butyl peroxypivalate, di-isononanoyl peroxide, di-decanoyl peroxide, t-amyl peroxy-2-ethylhexanoate, t-butyl peroxy-2-ethylhexanoate, 2,2'-Azobis(2,4-Dimethylvaleronitrile), 2,2'-Azobis(2-Methylbutyronitrile), 1,1'-Azobis(Cyanocyclohexane), and combinations thereof.

33. The acrylic copolymer composition of claim 17, wherein said MMA contains up to 5 wt. % of additives selected from the group consisting of butyl acrylate, ethylene glycol dimethacrylate, dodecylmercaptan, a colorant, titanium dioxide, carbon black, t-amyl peroxy neodecanoate, t-butyl peroxyneoheptanoate, t-amyl peroxypivalate, t-butyl peroxypivalate, di-isononanoyl peroxide, di-decanoyl peroxide, t-amyl peroxy-2-ethylhexanoate, t-butyl peroxy-2-ethylhexanoate, 2,2'-Azobis(2,4-Dimethylvaleronitrile), 2,2'-Azobis(2-Methylbutyronitrile), 1,1'-Azobis(Cyanocyclohexane), and combinations thereof.

34. The acrylic copolymer composition of claim 19, wherein said MMA contains up to 5 wt. % of additives selected from the group consisting of butyl acrylate, ethylene glycol dimethacrylate, dodecylmercaptan, a colorant, titanium dioxide, carbon black, t-amyl peroxy neodecanoate, t-butyl peroxyneoheptanoate, t-amyl peroxypivalate, t-butyl peroxypivalate, di-isononanoyl peroxide, di-decanoyl peroxide, t-amyl peroxy-2-ethylhexanoate, t-butyl peroxy-2-ethylhexanoate, 2,2'-Azobis(2,4-Dimethylvaleronitrile), 2,2'-Azobis(2-Methylbutyronitrile), 1,1'-Azobis(Cyanocyclohexane), and combinations thereof.

35. The acrylic copolymer composition of claim 1, wherein said partially polymerized syrup comprises an effective amount of at least one additive selected from the group consisting of t-butyl peroxyneodecanoate, 2,2'-azobis-(isobutyrornitrile), ethylene glycol dimethacrylate, lauryl mercaptan, 2-(2'hydroxy-5'-methy phenyl) benzotriazole, N-dodecyl mercaptan, decanoyl peroxide, tri-isoctyl phosphite, titanium dioxide/dibutyl phthalate, and combinations thereof.

36. The acrylic copolymer composition of claim 17, wherein said partially polymerized syrup comprises an effective amount of at least one additive selected from the group consisting of t-butyl peroxyneodecanoate, 2,2'-azobis-(isobutyronitrile), ethylene glycol dimethacrylate, lauryl mercaptan, 2-(2'hydroxy-5'-methyl phenyl) benzotriazole, N-dodecyl mercaptan, decanoyl peroxide, tri-isoctyl phosphite, titanium dioxide/dibutyl phthalate, and combinations thereof.

37. The acrylic copolymer composition of claim 19, wherein said partially polymerized syrup comprises an effective amount of at least one additive selected from the group consisting of t-butyl peroxyneodecanoate, 2,2'-azobis-isobutyronitrile), ethylene glycol dimethacrylate, lauryl mercaptan, 2-(2'hydroxy-5'-methyl phenyl) benzotriazole, N-dodecyl mercaptan, decanoyl peroxide, tri-isoctyl phosphite, titanium dioxide/dibutyl phthalate, and combinations thereof.

* * * * *